Sept. 30, 1952 M. MOONEY 2,612,369
THERMALLY COMPENSATED RUBBER SPRINGS
Filed Dec. 23, 1948 3 Sheets-Sheet 1
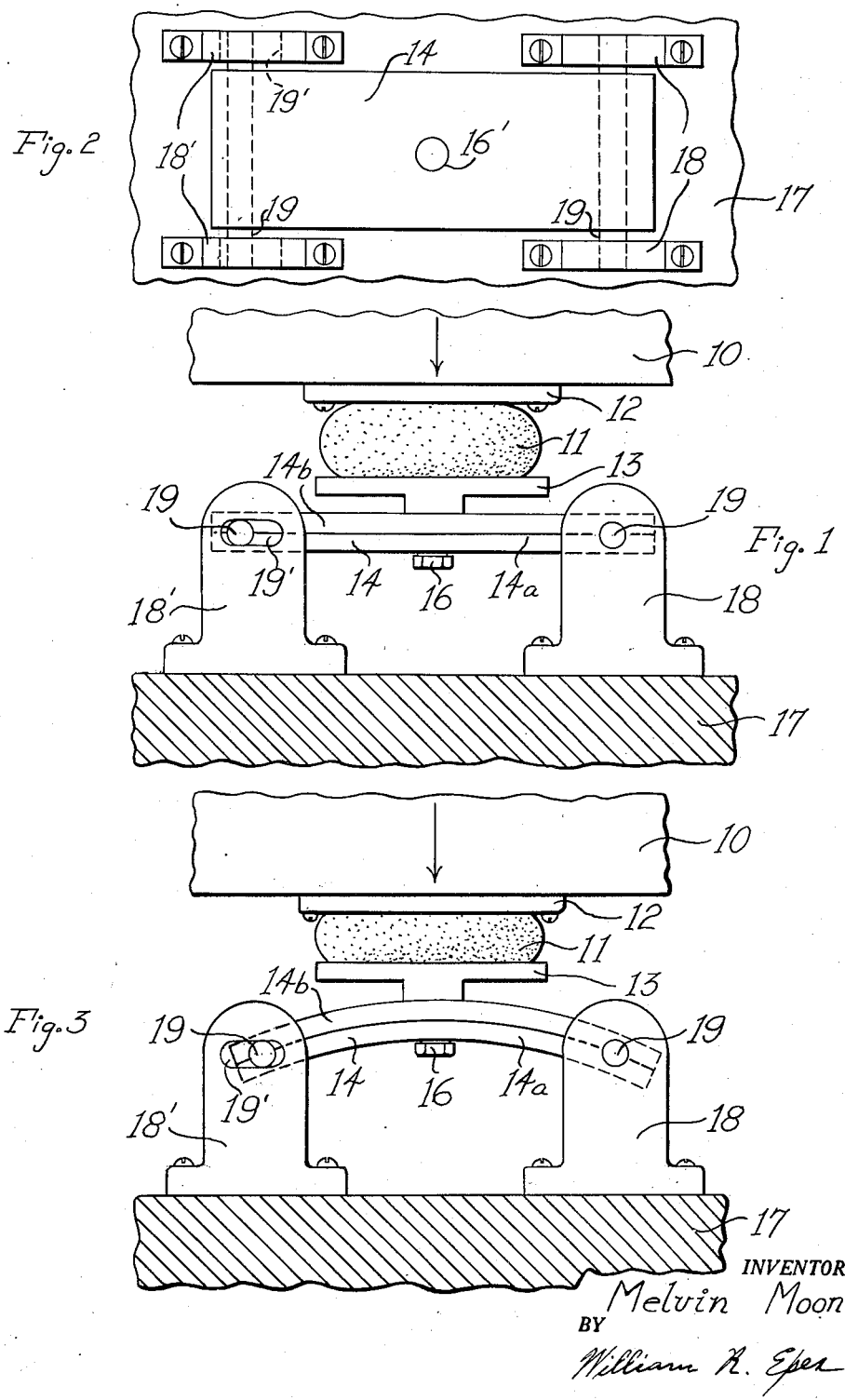
INVENTOR.
Melvin Mooney
BY
William H. Epes

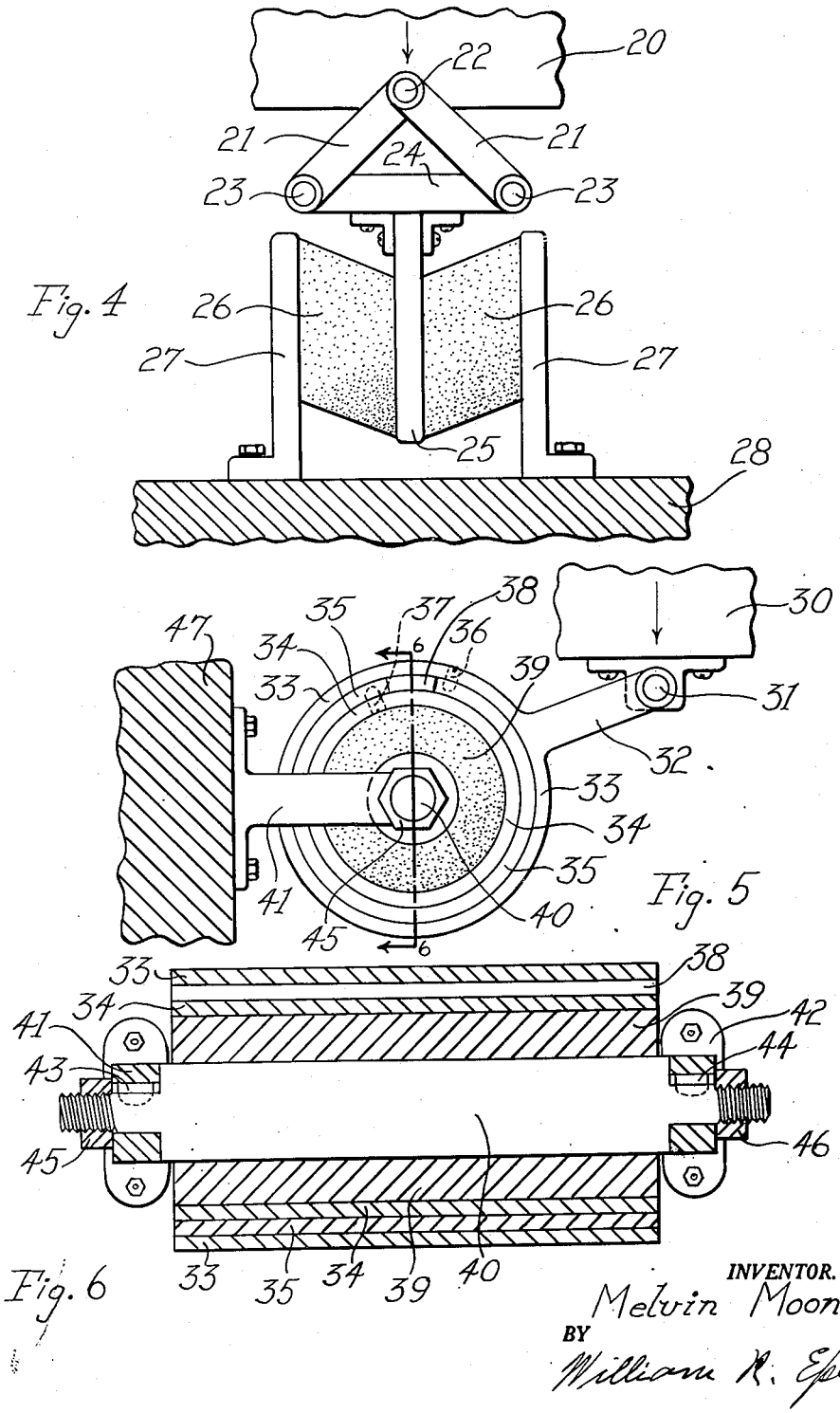

INVENTOR.
Melvin Mooney
BY
William R. Eper

Patented Sept. 30, 1952

2,612,369

UNITED STATES PATENT OFFICE 2,612,369

THERMALLY COMPENSATED RUBBER SPRINGS

Melvin Mooney, Mountain Lakes, N. J., assignor to United States Rubber Company, New York, N. Y., a corporation of New Jersey Application December 23, 1948, Serial No. 66,901

7 Claims. (Cl. 267—63)

My invention relates to resilient mountings and more particularly to rubber springs embodying a thermal compensating element.

The use of rubber springs as resilient mountings for automobile spring suspensions and other devices has certain advantages over the use of steel springs. However, rubber automobile springs and the like have met with limited acceptance because of the large effect of the temperature on the spring constant and on the height at which the load is supported by the springs. This effect is due to the fact that the modulus of rubber and similar elastomers is, at least approximately, proportional to the absolute temperature over the temperature range at which rubber mountings are usually used, e. g., from —10° to +100° F., so that the level at which the load is supported will change with changing temperature. Thus, an automobile body supported at the correct level by conventional rubber springs at normal temperatures will sag too low when the temperature drops. This change in the level at which the load is supported with changing temperature is undesirable in many installations, particularly in the case of motors and other devices which must be connected by shafts or gears to other machinery.

The principal object of the present invention is to provide a rubber spring assembly which will support a load at a substantially constant level with changing temperature of the rubber spring.

The invention comprises a combination of a load-carrying, vibration-absorbing rubber mounting subject to dimensional changes, due to the effect of changes in temperature upon the modulus of the rubber, normally resulting in relative movement between the load and the support, with a thermally responsive element adapted to produce, upon changes in temperature, compensating movement in the opposite direction whereby the load is supported at a substantially constant level independent of temperature. The thermally responsive element may be any suitable means for producing movement in response to a temperature change, such as a bimetallic unit, that is, a unit composed of dissimilar metals having appreciably different thermal coefficients of expansion, or an enclosed body of fluid which produces movement as its volume changes with changing temperature.

Exemplary embodiments of my invention are illustrated in the accompanying drawings, wherein:

Fig. 1 is an elevation of a compression type of rubber mounting which rests on a bimetallic plate attached to a support by pivotal connections;

Fig. 2 is a plan view of the bimetallic plate of Fig. 1 and its support, disconnected from the rubber mountings;

Fig. 3 is a view similar to Fig. 1 showing in a more or less exaggerated way how the bimetallic plate bends upwardly and raises the lower plate of the rubber mounting when the temperature drops, so as to compensate for the flattening out of the rubber;

Fig. 4 is an elevation of a shear type of rubber mounting thermally compensated by means of a bimetallic linkage;

Fig. 5 is a front elevation of a sleeve type of rubber mounting thermally compensated by a split sleeve of dissimilar metal incorporated in the mounting;

Fig. 6 is a sectional side view of the mounting on line 6—6 of Fig. 5;

Figure 7:
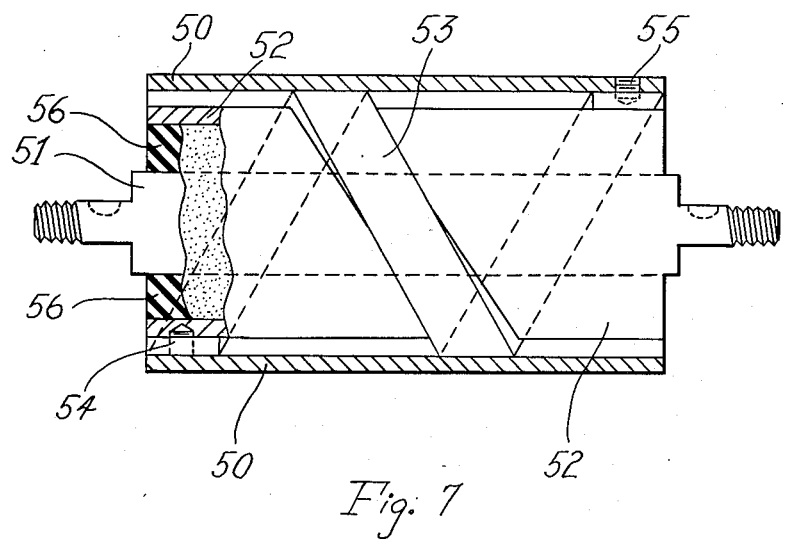
Fig. 7 is a sectional view of a torsional mounting in which the thermal compensator is a helical element.

Referring to Fig. 1, the load applying member 10 is supported on a conventional compression type of rubber mounting having a vulcanized rubber vibration-absorbing member 11 suitably bonded to the upper and lower end plates 12 and 13 respectively. The mounting is supported on a bimetallic plate 14 consisting of a lower plate 14a made of a metal having a relatively high thermal coefficient of expansion, e. g., steel, and an upper plate 14b made of a metal having a relatively lower thermal coefficient of expansion, e. g., Invar. These two dissimilar metallic plates are bonded together at their opposing surfaces. It is evident that as the temperature drops, this bimetallic plate will assume a curved shape with the steel on the inside of the curve since the steel will contract more than Invar. The bimetallic plate 14 is fastened at its center to the lower plate 13 of the rubber mounting by means of a bolt 16 passing through hole 16' in plate 14 (shown in Fig. 2), and is pivotally fastened to a support 17 at its ends by the brackets 18 and 18' and the pivotal connections 19. One of the pivotal connections 19 is oscillatable about a fixed center in the brackets 18, and the other connection is oscillatable and slidable in slots 19' in the brackets 18'.

Fig. 3 shows in a more or less exaggerated form how the bimetallic plate 14 produces an upward movement of lower plate 13 with respect to the support 17 as the temperature decreases. The decrease in temperature has caused a decrease in the modulus of the rubber 11 and consequently has resulted in increased flattening of the rubber, which, if not compensated, would result in a lowering of the load 10 below the level at which it is desired to maintain it. Since the Invar strip 14b has a relatively low thermal co-efficient of expansion compared to the steel strip 14a, the bimetallic plate curves upwardly from the pivotal connections 19 and produces the desired compensating elevation of the mounting so that the position of the load with respect to the support remains unchanged.

Conversely, a rise in temperature will produce a reverse compensating movement of the bimetallic plate, because as the load tends to rise with increase in temperature, due to the resulting increase in the modulus of the rubber, the bimetallic plate will curve downwardly from the pivotal connections 19, producing the desired compensating downward movement of the mounting with respect to the support 17.

This method of thermal compensation is applicable to all types of rubber mountings. For example, a shear type of mounting is shown in Fig. 4 compensated by a bimetallic linkage. The load applying member 20 is connected to the shear mounting through a thermally responsive bimetallic linkage consisting of two bars 21 of a metal having a relatively low thermal coefficient of expansion, e. g., Invar. The bars 21 are pivotally joined to each other and to the load applying member 20 at one end, by a pin 22, and at the other ends are pivotally joined by pins 23 to a metal bar 24, such as steel, having a relatively greater thermal coefficient of expansion. This metallic linkage is suitably fastened to the central plate 25 of a conventional shear sandwich type of rubber mounting consisting of two vulcanized rubber vibration-absorbing bodies 26 which are suitably bonded to the central plate 25 and to the outside plates 27. The outside plates are suitably rigidly attached to the support 28.

It will be evident that as the load 20 tends to drop because of a drop in temperature, the downward movement of the load will be compensated by an upward movement of pivotal connection 22, since the Invar strips 21 contract relatively little with falling temperature compared to the steel strip 24. The pivotal connections 22 and 23 permit this compensating movement.

One method of applying the bimetallic compensating element to a sleeve, or torsion, type of rubber mounting is illustrated in Figs. 5 and 6. The load applying member 30 is pivotally attached by a pin 31 to an arm 32 on the outer metal sleeve 33 of the mounting. The mounting has an inner sleeve 34 disposed within and spaced from the outer sleeve 33, and between these two sleeves 33 and 34 is a split sleeve thermal compensating element 35, made of a metal having a relatively low thermal coefficient of expansion. The split sleeve 35 may be made, for example, of Invar, while the outer and inner sleeves 33 and 34 may be made of steel. There is sufficient clearance between the split sleeve 35 and the outer and inner sleeves 33 and 34 to permit relative rotation of the sleeves, and the contacting surfaces of the sleeves may be lubricated, if desired, to facilitate relative rotation. One end of the split sleeve 35 is rigidly attached to the outer sleeve 33 by a screw 36. The other end of the split sleeve is rigidly attached to the inner sleeve 34 by a screw 37. There is a gap 38 between the ends of the split sleeve, to permit relative rotation of the inner and outer sleeves upon change in temperature. The remainder of the mounting is of conventional construction and consists of a cylindrical vibration-absorbing vulcanized rubber member 39 suitably bonded to the inner sleeve 34 and to a central shaft or core 40. The ends of the core 40 are keyed to supporting brackets 41 and 42 by keys 43 and 44. The mounting is secured to the supporting brackets 41 and 42 by nuts 45 and 46, screwed on the threaded ends of core 40. The supporting brackets are rigidly attached to a load supporting member 47.

It will be evident that the weight of the load 30 causes a clockwise strain in the rubber body 39. As the temperature decreases this clockwise strain tends to increase because of decreasing modulus of the rubber. However, the circumferential thermal contraction of the Invar split sleeve 35 which occurs due to this decrease in temperature is very small compared to the circumferential contraction of the steel sleeves 33 and 34. This means that the circumference of the Invar sleeve 35 will become relatively greater with respect to the circumference of the steel sleeves 33 and 34 as the temperature decreases. Therefore the gap 38 between the ends of the split sleeve 35 becomes smaller and the outer steel sleeve 33 is moved in a counter-clockwise direction as the temperature decreases, thus compensating for the increased clockwise strain of the rubber, so that the position of the load 30 with respect to the supporting arm 41 remains unchanged.

It will be evident to those skilled in the art that similar thermal compensation can be obtained if the split sleeve 35 has a relatively greater thermal coefficient of expansion than the outer and the inner sleeves 33 and 34, simply by reversing the connections of the ends of the split sleeve 35 with inner and outer sleeves 33 and 34, so that the end shown in Fig. 5 as being connected to the outer sleeve would be connected to the inner sleeve, and the end shown as being connected to the inner sleeve would be connected to the outer sleeve. When the connections are so reversed a drop in temperature will cause the gap 38 to become wider, thus causing the desired counter-clockwise rotation of the outer sleeve with respect to the inner sleeve.

In some cases it may be necessary, because of the temperature coefficient of the modulus of the rubber or because of the relative expansivity of the split sleeve compared with the material of the inner and outer sleeves, to employ a longer split sleeve than is possible with the construction illustrated in Figs. 5 and 6. In such cases the split sleeve may be a helical compensating element as illustrated in Fig. 7. The outer sleeve 50 of this mounting is intended to be attached to a load-applying member or to a support in a conventional manner, e. g., in the same manner as shown in Fig. 5. The central shaft or core 51 is similarly intended to be attached to a support or to a load in the conventional manner. The outer sleeve 50 and the inner sleeve 52 are relatively rotatable and have disposed therebetween a helical element 53 made of Invar or other metal having a relatively low thermal coefficient of expansion. One end of the helix is attached to the inner sleeve by means of a screw 54 and the other end of the helix is attached to the outer sleeve by means of the screw 55. The vulcanized rubber vibration-absorbing cylinder 56 is suitably bonded to the inner sleeve 52 and to the central shaft 51 in the conventional manner. The method of operation of this type of compensating element is the same as that of the compensating element of Figs. 5 and 6, that is, the difference in thermal expansion of the helical element 53 and the inner and outer sleeves 50 and 52 results in a compensatory rotation of the two sleeves thus raising or lowering the load relative to the support as the temperature changes.

In place of using a thermal compensating element which is actuated by a bimetallic unit, I may employ a thermal compensating element which is actuated by the expansion or contraction of a body of fluid, preferably a liquid. Such a compensating element is conveniently a Sylphon bellows filled with a suitable oil or other liquid.

Figure 8:
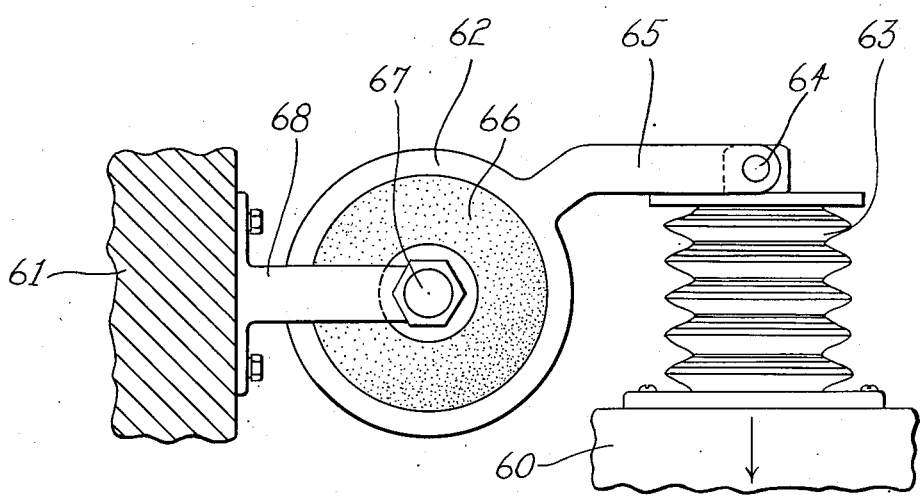
Fig. 8 is an elevation of a sleeve or torsional mounting thermally compensated by a liquid-filled expansible bellows.

For example, a sleeve type of mounting, in which the rubber is subjected to torsional strains, may be thermally compensating as shown in Fig. 8 wherein a load applying member 60 is resiliently suspended from a support 61. An outer sleeve 62 of the mounting is attached to a Sylphon bellows 63 by a pivotal connection 64 between the bellows and an arm 65 on the sleeve 62. A cylindrical vulcanized rubber body 66 is bonded to the sleeve 62 and the central core 67 in the usual manner, and the core is attached to the support 61 by means of an arm 68 in the manner described in reference to Figs. 5 and 6. It is evident that the clockwise movement of the sleeve 62 and consequent drop in the level at which the suspended load is supported, caused by a decrease in temperature, will be compensated by the contraction of the bellows 63, which contraction will cause an upward movement of the load applying member 60 so that the load remains at substantially the desired level independently of changes in the temperature of the surroundings.

It will also be evident to those skilled in the art that the particular construction and placement of the bimetallic or fluid-actuated thermal compensating element may be varied as desired to suit the particular type of mounting that may be required for the specific installation involved.

Having thus described my invention, what I claim and desire to protect by Letters Patent is:

1. A resilient supporting device comprising, in series, a rubber body adapted to undergo elastic deformation under a load, and a thermally responsive compensating element adapted upon change in temperature to deform by an amount which is equal and opposite to the change in deformation of the rubber induced by said change in temperature, whereby the device is capable of maintaining a load at a constant position independent of temperature.

2. A resilient supporting device comprising, in series, a rubber body adapted to undergo elastic deformation under a load, and a bimetallic linkage composed of metals of different coefficients of thermal expansion and adapted upon change in temperature to deform by an amount which is equal and opposite to the change in deformation of the rubber induced by said change in temperature, whereby the device is capable of maintaining a load at a constant position independent of temperature.

3. A resilient supporting device comprising, in series, a rubber body adapted to undergo elastic deformation under a load, and a closed flexible container of fluid adapted upon change in temperature to deform by an amount which is equal and opposite to the change in deformation of the rubber induced by said change in temperature, whereby the device is capable of maintaining a load at a constant position independent of temperature.

4. A resilient supporting device comprising, in series, a rubber body adapted to undergo elastic deformation under a load, and a bimetallic plate composed of metals of different coefficients of thermal expansion and adapted upon change in temperature to deform by an amount which is equal and opposite to the change in deformation of the rubber induced by said change in temperature, whereby the device is capable of maintaining a load at a constant position independent of temperature.

5. A resilient supporting device comprising, in series, a rubber body adapted to undergo elastic deformation under a load, and a bimetallic linkage composed of two elements of one kind of metal and a third element of a metal having a different coefficient of thermal expansion, said elements being pivotally linked together at their ends and adapted upon change in temperature to effect a displacement which is equal and opposite to the change in deformation of the rubber induced by said change in temperature, whereby the device is capable of maintaining a load at a constant position independent of temperature.

6. A resilient supporting device comprising, in series, a rubber body adapted to undergo elastic deformation under a load, and a Sylphon bellows adapted upon change in temperature to deform by an amount which is equal and opposite to the change in deformation of the rubber induced by said change in temperature, whereby the device is capable of maintaining a load at a constant position independent of temperature.

7. In a rubber spring for resiliently attaching a load to a support, of the type comprising a sleeve member, a central core member, and a rubber body interposed between and bonded to said members, and wherein the change in modulus of the rubber with change in temperature normally results in a corresponding change in the level at which the load is supported, the improvement which comprises in combination with said rubber spring an outer sleeve member, and a split sleeve interposed between said other sleeve members and having opposed portions thereof engaging respectively the one and the other of said sleeve members, and said split sleeve having a coefficient of thermal expansion different from that of said other sleeve members and being adapted upon change in temperature to rotate said outer sleeve by an amount which is equal and opposite to the change in the deformation of the rubber induced by said temperature change, whereby the device is capable of maintaining a load at a constant position independent of temperature.

MELVIN MOONEY.

REFERENCES CITED

The following references are of record in the file of this patent:

UNITED STATES PATENTS

| Number | Name | Date |
| --- | --- | --- |
| 1,636,708 | Rockefeller | July 26, 1927 |
| 2,191,211 | Krotz | Feb. 20, 1940 |
| 2,253,904 | Haug | Aug. 26, 1941 |
| 2,270,572 | Woolson et al. | Jan. 20, 1942 |
| 2,318,437 | Vickers | May 4, 1943 |

FOREIGN PATENTS

| Number | Country | Date |
| --- | --- | --- |
| 379,770 | Italy | Apr. 5, 1940 |